US008099285B2

(12) United States Patent
Smith et al.

(10) Patent No.: US 8,099,285 B2
(45) Date of Patent: Jan. 17, 2012

(54) TEMPORALLY ACCURATE WATERMARKING SYSTEM AND METHOD OF OPERATION

(75) Inventors: Brandon Smith, Seattle, WA (US); Jeffrey Thompson, Bothell, WA (US); Aaron Warner, Seattle, WA (US)

(73) Assignee: DTS, Inc., Calabasas, CA (US)

( * ) Notice: Subject to any disclaimer, the term of this patent is extended or adjusted under 35 U.S.C. 154(b) by 1026 days.

(21) Appl. No.: 12/001,851

(22) Filed: Dec. 13, 2007

(65) Prior Publication Data
US 2009/0157204 A1 Jun. 18, 2009

(51) Int. Cl.
*G10L 11/00* (2006.01)
*G10L 19/00* (2006.01)
*H04N 7/167* (2006.01)
(52) U.S. Cl. ............. 704/273; 704/200.1; 380/236
(58) Field of Classification Search .......... 704/273
See application file for complete search history.

(56) References Cited

U.S. PATENT DOCUMENTS

| 7,461,002 | B2* | 12/2008 | Crockett et al. | 704/278 |
|---|---|---|---|---|
| 7,676,336 | B2* | 3/2010 | Herre et al. | 702/77 |
| 2002/0059059 | A1* | 5/2002 | Iliev et al. | 704/200.1 |
| 2003/0219036 | A1* | 11/2003 | Iliev et al. | 370/480 |
| 2003/0221106 | A1* | 11/2003 | Delp et al. | 713/176 |
| 2005/0105726 | A1* | 5/2005 | Neubauer et al. | 380/201 |

OTHER PUBLICATIONS

Chen et al., "A robust watermarking scheme using phase shift keying with the combination of amplitude boost and low amplitude block selection", Pattern Recognition, vol. 38, No. 4, pp. 587-598, 2005.*

Xu et al., "Stream-Based Interactive Video Language Authoring Using Correlated Audiovisual Watermarking," *Proceedings of the Third International Conference on Information Technology and Applications (ICITA'05)*, © 2005 IEEE.
"An Error Correction Strategy for Digital Audio Watermarking Scheme" Sonia Saied-Bouajina, Sonia Larbi, Rached Hamza, Larbi Belhadj Slama and Meriem Jaidane-Saidane; IEEE; Published 2004.
"Chaos Based Audio Watermarking with MPEG Psychoacoustic Model I" A. Giovanardi, G. Mazzini, M. Tomassetti; IEEE; Published Dec. 15-18, 2003.
"Attacks on Digital Audio Watermarks and Countermeasures" Michael Arnold; IEEE; Published 2003.
"Covert Audio Watermarking Using Perceptually Tuned Signal Independent Multiband Phase Modulation" Shyh-shiaw Kuo, James D. Johnston, William Turin, Schuyler R. Quackenbush; IEEE; Published 2002.
"Digital Audio Watermarking in the Cepstrum Domain" Sang-Kwang Lee, Yo-Sung Ho; IEEE, vol. 46, No. 3; Published Aug. 2003.

(Continued)

*Primary Examiner* — Samuel G Neway
(74) *Attorney, Agent, or Firm* — Gaurav K. Mohindra; William Johnson (57) ABSTRACT

A system for identifying audio data is provided. The system includes a transform system receiving left channel audio data and right channel audio data and generating a plurality of frequency bins of left channel magnitude data, left channel phase data, right channel magnitude data and right channel phase data. A watermarking system receives watermarking data and modifies predetermined frequency bins of the left channel phase data and the right channel phase data to encode the watermarking data. A magnitude system receives the left channel magnitude data and the right channel magnitude data and increases the left channel magnitude data and the right channel magnitude data for one or more of the predetermined frequency bins to a threshold level if the left channel magnitude data and the right channel magnitude data for the corresponding frequency bin is less than the threshold level.

8 Claims, 5 Drawing Sheets

OTHER PUBLICATIONS

"Digital Audio Watermarking and Its Application in Multimedia Database" Changsheng Xu, Jiankang Wu, and Qibin Sun; Signal Processing Research Centre; Published Aug. 22-25, 1999.

"Robust Audio Watermarking Scheme Based on Nonuniform Discrete Fourier Transform" Ling Xie, Jiashu Zhang, and Hongjie He; IEEE; Published 2006.

* cited by examiner

TEMPORALLY ACCURATE WATERMARKING SYSTEM AND METHOD OF OPERATION

FIELD OF THE INVENTION

The present invention relates to watermarking content, and more particularly to a temporally accurate watermarking system and method of operation.

BACKGROUND OF THE INVENTION

Watermarking of audio, video and audiovisual content is typically performed to allow the source of the content to be verified. Such verification is used to determine whether the content is authentic, licensed, has been misappropriated, or for other reasons. However, the temporal accuracy of the watermark is generally not important, because such verification can be performed on a large sample of the data without regard to temporal accuracy of the location of the watermark.

SUMMARY OF THE INVENTION

Therefore, a temporally accurate watermarking system and method of operation are provided that overcome problems associated with watermarking digital data streams.

In particular, a temporally accurate watermarking system and method of operation are provided that utilize embedded timing information in a manner that allows the timing of the audio signal to be determined, such as for synchronization with a video signal.

In accordance with an exemplary embodiment of the invention, a system for identifying audio data is provided. The system includes a transform system receiving left channel audio data and right channel audio data and generating a plurality of frequency bins of left channel magnitude data, left channel phase data, right channel magnitude data and right channel phase data. A watermarking system receives watermarking data and modifies predetermined frequency bins of the left channel phase data and the right channel phase data to encode the watermarking data. A magnitude system receives the left channel magnitude data and the right channel magnitude data and increases the left channel magnitude data and the right channel magnitude data for one or more of the predetermined frequency bins to a threshold level if the left channel magnitude data and the right channel magnitude data for the corresponding frequency bin is less than the threshold level.

The present invention provides many important technical advantages. One important technical advantage of the present invention is a temporally accurate watermarking system and method of operation that utilizes phase differences in predetermined frequency bins to encode watermarking data and that further utilizes phase differences in successive frames to encode timing information.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

Figure 1:
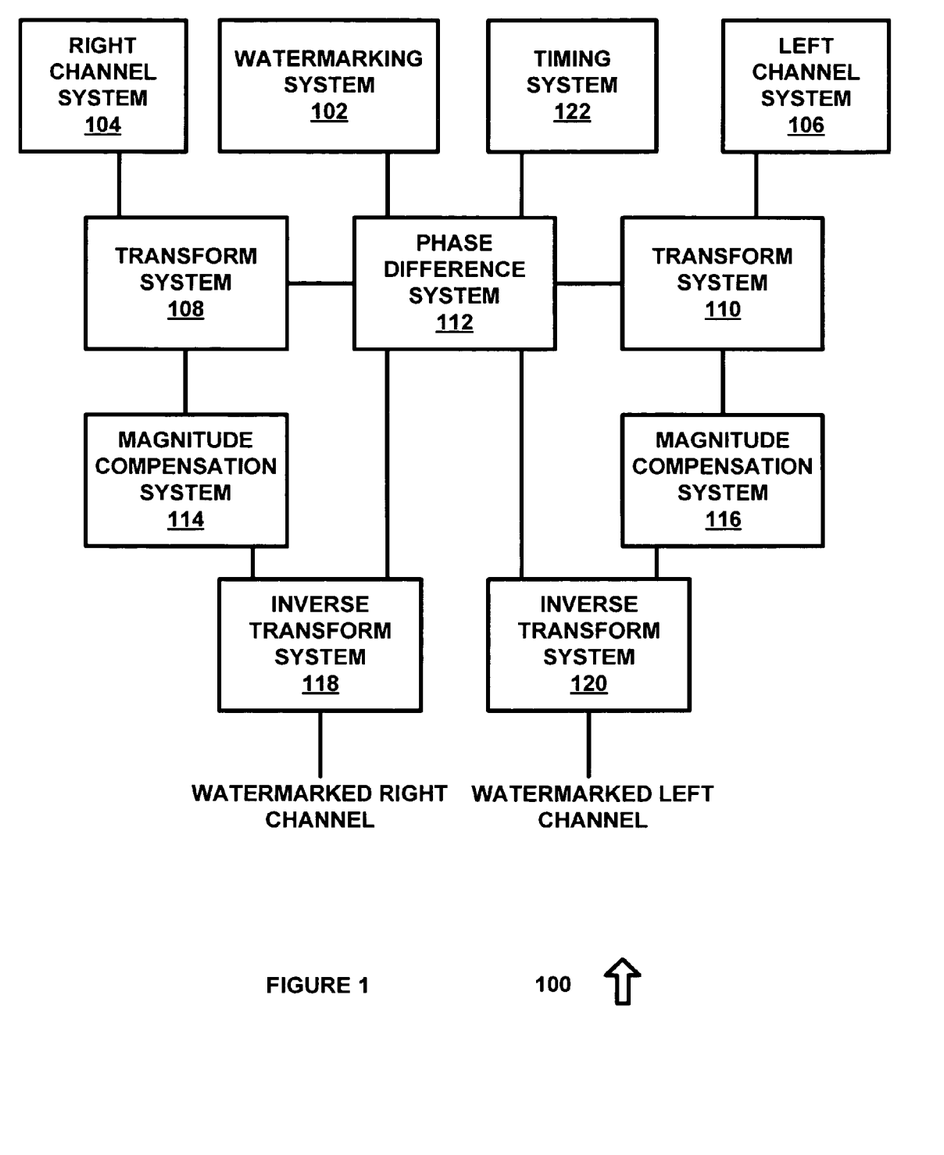
FIG. 1 is a diagram of a system for embedding a watermark in a digital data stream in accordance with an exemplary embodiment of the present invention.

FIG. 1 is a diagram of a system 100 for embedding a watermark in a digital data stream in accordance with an exemplary embodiment of the present invention. System 100 allows a watermark to be embedded in a stream of audio data so as to be detected by a receiving station.

System 100 includes watermarking system 102, right channel system 104, left channel system 106, transform systems 108 and 110, phase difference system 112, magnitude compensation systems 114 and 116, inverse transform systems 118 and 120, and timing system 122, each of which can be implemented in hardware, software, or a suitable combination of hardware and software, and which can be one or more software systems operating on a digital signal processing platform. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Watermarking system 102 generates watermark data for watermarking audio data. In one exemplary embodiment, watermarking system 102 can generate a predetermined eight bit watermark, a randomly varying eight bit watermark, or other suitable watermarks. In another exemplary embodiment, the value of the watermark data generated by watermarking system 102 can be recorded based on time of generation, source, intended destination or other suitable data, so as to allow the value of the watermark data to be used to determine the time of generation, source, intended destination, or other suitable data.

Right channel system 104 and left channel system 106 receive audio data and convert the audio data into a frame of data for processing by transform systems 108 and 110, respectively. In one exemplary embodiment, right channel system 104 and left channel system 106 can provide a predetermined length of audio data for conversion, such as 20 milliseconds.

Transform systems 108 and 110 receive a predetermined time period of audio data from right channel system 104 and left channel system 106 and transform the data from a time domain to a transform domain, such as a frequency domain. In one exemplary embodiment, transform systems 108 and 110 can be a single transform system that operates on alternating samples or frames of data from right channel system 104 and left channel system 106. In another exemplary embodiment, transform systems 108 and 110 receive temporal audio data and perform a Fast Fourier Transform (FFT) on the audio data to generate a frame of digital data that has phase and magnitude data for a plurality of frequency bins, such as 1024 frequency bins that are evenly spaced from 0.0 Hz to 9.0 kHz, or other suitable numbers of bins and frequency ranges. Likewise, where other transforms are used, the phase and magnitude processing systems described herein can be replaced with other suitable systems. For example, if a discrete cosine transform is used, then the output of transform systems 108 and 110 can be magnitude and frequency harmonic components. Other suitable transforms can alternatively be used.

Phase difference system 112 receives phase data from transform systems 108 and 110 and encodes watermarking data from watermarking system 102 into a phase difference. In one exemplary embodiment, phase difference system 112 can encode an eight bit watermark received from watermarking system 102 into predetermined frequency bins over a predetermined range. For example, where transform system 108 and 110 perform an FFT, the output will include a magnitude and phase representation of a frame of incoming audio, such as 1024 frequency bins. The FFT data is watermarked by modifying the phase of predetermined frequency bins to have a fixed and predetermined frequency difference, such as frequency bins that are evenly distributed over a predetermined frequency range such as 3.5 kHz to 9 kHz. Multiple frequency bins can be utilized in order to reduce the effects of errors that may be introduced by subsequent encoding and decoding of the audio data. In one exemplary embodiment, bins 149 through 157 of the left and right audio channel phase data can be modified to embed a least significant of the eight bit audio data or watermarking data, bins 178 through 186 can be modified for the next bit, and so forth, or other suitable processes can be used. In this exemplary embodiment, the phase of the right channel can be forced to have a value that is $\Pi/2$ degrees greater than that of the left to encode a value of binary one. Likewise, for a value of binary zero the phase of the right channel can be forced to have a value that is $\Pi/2$ degrees less than that of the left. Other suitable processes can also or alternatively be used to encode the watermarking data, such as where transforms other than an FFT transform are utilized.

Magnitude compensation systems 114 and 116 receive right and left channel magnitude data and modify the magnitude data where necessary. In one exemplary embodiment, magnitude compensation systems 114 and 116 can be implemented as a single system that alternately processes frames of left and right channel data. In another exemplary embodiment, magnitude data corresponding to the predetermined frequency bins containing watermark data and timing data can be increased to a predetermined value, such as to add an amount of energy as either a scalable user parameter or to a default level such as 1.0, which corresponds to a frequency dependent magnitude described by the Fletcher-Munson absolute threshold of hearing curve. Under normal listening conditions, with no audio input, the audio data generated by modifying these magnitude bins is inaudible, but the additional energy ensures that the watermark data and timing data associated with these frequency bins can still be detected. Note that if the energy of the incoming audio signals surpasses the absolute threshold of hearing, then the bin magnitude does not need to be modified, such that the magnitude of the bins does not need to be reduced. Other suitable processes can also or alternatively be used to modify the energy data, such as where transforms other than an FFT transform are utilized.

Inverse transform systems 118 and 120 receive the watermarked left and right channel phase data from phase difference system 112 and the magnitude compensated left and right channel data from magnitude compensation systems 114 and 116 and perform an inverse transform on the data. In one exemplary embodiment, the transform is an FFT and inverse transform systems 118 to 120 perform an inverse FFT using the watermarked left and right channel data to generate watermarked right channel and left channel time domain data. In this manner, the watermarked time domain data can be further processed as needed to provide necessary sound and data transmission processing such as Dolby E, Dolby digital, MP3, AAC, or other suitable processing.

Timing system 122 receives phase data from the phase difference system and modifies the phase data to provide a variable predetermined phase difference at successive frames of data. In one exemplary embodiment, timing system 122 can interface with phase difference system 112 to modify the phase of a plurality of frequency bins by a predetermined factor for each frame of a plurality of successive frames. In this exemplary embodiment, the phase differences at predetermined frequency bins for each frame in a sequence of frames can be modified by $(\Pi-n*(\Pi/8))$ degrees, such that the frequency difference of all predetermined frequency bins between successive frames varies by a predetermined amount. In this manner, timing data can be obtained by monitoring the phase difference at successive frames. Likewise, different frequency bins can be altered by different amounts, such as to provide multiple levels of timing data encoding.

In one exemplary embodiment, timing system 122 operates in a manner similar to encoding of watermark data. Instead of adjusting the phase difference between the predetermined frequency bins of the left and right channel data to either $\Pi/2$ or $-\Pi/2$ (depending on whether a digital one or zero is being encoded), the phase difference between the first and second frame for predetermined frequency bins associated with the timing data is adjusted to be $\Pi/8$ between the first and second frames, $2*\Pi/8$ between the first and third frames, $3*\Pi/8$ between the first and fourth frames and so forth, so as to encode timing data in a manner that is different from the watermark data.

In this exemplary embodiment, encoding an eight bit watermark can be performed by modifying a frequency difference between the left and right frequency channel bins numbered 149 through 157 (out of 1024) by $\Pi/2$ to encode a digital zero, by modifying a frequency difference between the left and right frequency channel bins numbered 178 through 186 by $-\Pi/2$ to encode a digital one, and so forth for each of the eight bits of the watermark data. The same frequency bins can also be modified in the same manner for seven consecutive time frames so as to embed redundant watermark data in each of seven consecutive frames. The timing data can likewise be embedded over eight different sets of frequency bins, such for example frequency bins 162-170, 190-198, and so forth, where each frequency bin in each set is modified to have the same phase difference relative to that frequency bin in a different one of the seven consecutive frames. In this exemplary embodiment, the first frame may have all timing bins modified to have a phase difference of 7*Π/8, such that the timing detector can compare the predetermined frequency bins to detect an average difference that is close to 7*Π/8, corresponding to the first frame of the watermark.

In operation, system 100 allows a watermark to be inserted into audio data by modifying predetermined frequency bins with a predetermined phase differential. Modification of the frequency bins in this manner results in a watermark that is not audibly detectable, but which can still be detected after performing a transform of the translated data and monitoring the predetermined frequency bins to detect the predetermined phase difference.

Figure 2:
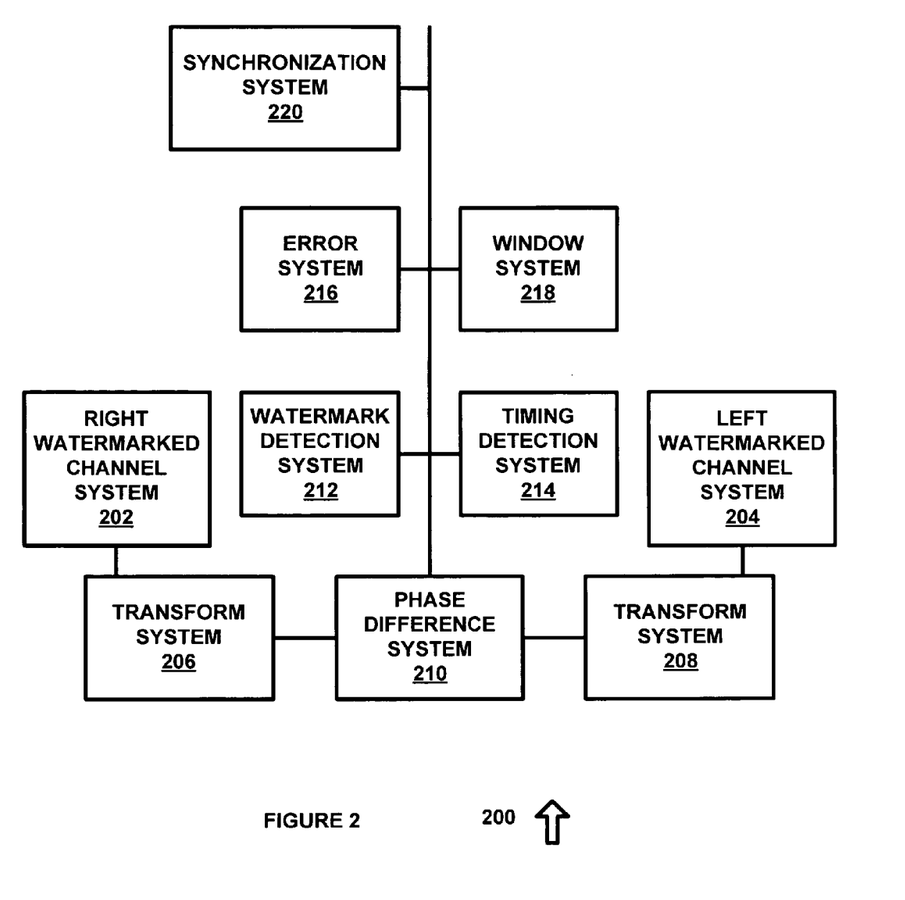
FIG. 2 is a diagram of a system for detecting an embedded watermark in accordance with an exemplary embodiment of the present invention.

FIG. 2 is a diagram of a system 200 for detecting an embedded watermark in accordance with an exemplary embodiment of the present invention. System 200 allows watermark data, such as that generated by system 100, to be processed in order to detect the watermark data.

System 200 includes right watermark channel system 202, left watermark channel system 204, transform systems 206 and 208, phase difference system 210, watermark detection system 212, timing detection system 214, error system 216, window system 218 and synchronization system 220, each of which can be implemented in hardware, software, or a suitable combination of hardware and software, and which can be one or more software systems operating on a special purpose processing platform such as a digital signal processor or other suitable platforms.

Right watermark channel system 202 and left watermark channel system 204 receive watermarked audio data and provide the watermark audio data to transform systems 206 and 208, respectively. In one exemplary embodiment, right watermark channel system 202 and left watermark channel system 204 can provide a predetermined length of audio data for conversion, such as 20 milliseconds.

Transform systems 206 and 208 can transform a predetermined time length of audio data from a time domain to a suitable transform domain, such as a frequency domain. In one exemplary embodiment, transform systems 206 and 208 can convert the audio data for a 20 millisecond sample into frequency domain data for 1024 frequency bins using an FFT, where each frequency bin has a magnitude and associated phase. In one exemplary embodiment, transform systems 206 and 208 can be replaced by a single transform system, such as one that alternately processes right and left channel audio data.

Phase difference system 210 computes the phase difference between the left and right channel frequency channel data. In one exemplary embodiment, phase difference system 210 can compute phase difference information for a plurality of predetermined frequency bins to watermark detection system 212 and timing detection system 214.

Watermark detection system 212 receives the phase difference information for predetermined frequency bins from phase difference system 210 and determines whether a predetermined phase difference is present in the predetermined frequency bins, which indicates the possible storage of bits of watermark data. In one exemplary embodiment, the watermark data can have a predetermined phase difference between the left and right audio channels, such as +Π/2 degrees for encoding a zero and −Π/2 degrees for encoding a one, such that detection of the predetermined phase difference in a plurality of predetermined frequency bins can be used to establish that watermarking data is present and can also be used to decode the value of the watermark.

In another exemplary embodiment, a running average of phase differences can be stored on a per-bit basis. In this exemplary embodiment, when consistent phase differences for the predetermined watermark data frequency bins for seven consecutive frames of data each equal one of the predetermined data bit values of Π/2 degrees or −Π/2 degrees, those data values are used to generate the watermark data.

In this exemplary embodiment, error system 216 can be used to provide a confidence measure of "watermark presence." When the error value generated by error system 216 is lower than a predetermined threshold, indicating that confidence is high enough, error system 216 can request watermark detection data from the watermark detection system 212, which provides the stored running average watermark data value. In this exemplary embodiment, error system 216 may not receive an error low enough to request the watermark detection data until final frame in the series of frames has been received and processed, such as the seventh frame.

Timing detection system 214 receives phase data for two successive frames and determines if the phase data has predetermined phase difference characteristics. In one exemplary embodiment, the phase data can be embedded as (Π−n* (Π/8)), where n varies between one and seven based on the sequence number of the frame of data. Timing detection system 214 allows a temporally accurate watermark to be recovered from streaming digital data.

Error system 216 receives phase data from watermark detection system 212 and timing detection system 214 and determines a level of confidence that the watermark exists. In another exemplary embodiment, successive sub-frame time-delayed windows of data can be analyzed in order to detect the window that is closest to the window containing the embedded watermark and timing data, in order to compensate for lack of synchronization between the watermark embedding and detecting systems. For example, where a 20 ms frame of audio data is processed to embed the watermark data and is transmitted asynchronously, the 20 ms frame of audio data generated by the detector will likely not overlap exactly with the 20 ms frame that was processed to embed the watermark data. In this exemplary embodiment, the expected phase difference or EPD for watermarking data and timing data is known, and an timing data error estimate can be calculated based on the detected phase difference or DPD and the EPD using the following algorithms:

$$\text{error} = \sum_{n} (EPD[n] - DPD[n])^2, \ 1 \le n \le x$$

where
  n=the frame sequence number; and
  x=the number of frames in the sequence.
This formula can be used to calculate an error for the timing data or the watermark data, such that the watermark data can be used based on frame data that result in the lowest error. In one exemplary embodiment, the error calculation is only used for the timing data, such as when the value of the watermark data is not known in advance at the detector.

Window system 218 receives successive frames of audio data and generates window data for use in identifying a closest window corresponding to the encoded data. Window system 218 can use sub-frame time delayed versions of the audio to try to minimize the error equation. In one exemplary embodiment, two successive frames of data can be obtained, and four detection processes can be performed based on successive amounts of overlap between the two frames of data. For example, detector processing can be performed on 1) frame 1 with no overlap with frame 2; 2) 75% of the trailing edge of frame 1 with 25% of the leading edge of frame 2; 3) 50% of the trailing edge of frame 1 with 50% of the leading edge of frame 2; and 4) 25% of the trailing edge of frame 1 with 75% of the leading edge of frame 2. In this manner, frame alignment can be performed to within one-quarter of an audio frame, such as within 5 milliseconds for a 20 millisecond frame. Other suitable amounts of overlap can also or alternatively be used.

Synchronization system 220 receives temporally accurate watermark data and synchronizes audio data to video data. In one exemplary embodiment, synchronization system 220 receives a watermark data value between 0 and 255, and a millisecond delay value based on the period of time when the watermark data began, which will be approximately seven audio frames in a system where seven consecutive frames of audio data are processed. In one exemplary embodiment, the temporally accurate watermark data can be used to synchronize frames of audio data to frames of video data, so as to allow a soundtrack for the video data to be synchronized with the action taking place in the video data as it is played. In this exemplary embodiment, time lag between the audio and video data can be reduced to a level where there is no apparent difference between the two data streams to a viewer.

In operation, system 200 allows watermarked audio data to be processed so as to collect embedded watermark and timing information. The timing information allows a temporally accurate watermark to be recovered, so as to allow time and source information to be obtained for watermarked audio data.

Figure 3:
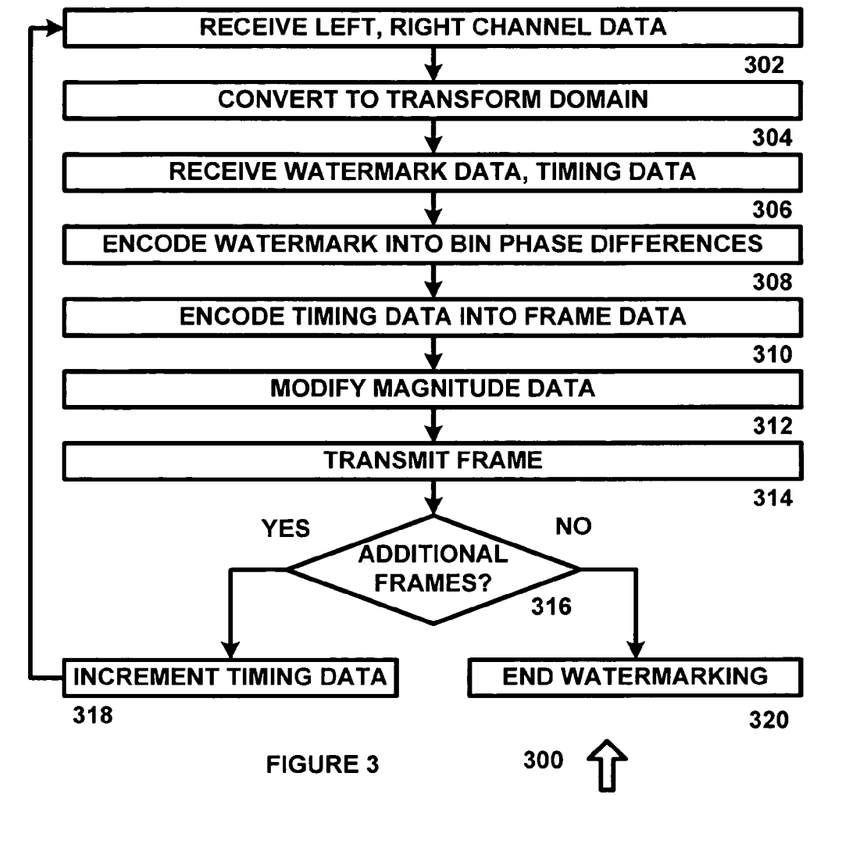
FIG. 3 is a diagram of a method for processing audio data to embed watermark and timing data in accordance with an exemplary embodiment of the present invention.

FIG. 3 is a diagram of a method 300 for processing audio data to embed watermark and timing data in accordance with an exemplary embodiment of the present invention. Method 300 begins with 302 where right and left channel audio data are received. In one exemplary embodiment, the right channel data and left channel data can be received over a predetermined time period, such as an amount of time necessary to convert the real time audio data into a frame of transform domain audio data. The method then proceeds to 304.

At 304, the audio data is converted from the time domain to a transform domain. In one exemplary embodiment, the transform domain can be a frequency domain, and an FFT can be performed on the audio data to generate phase and magnitude data. The method then proceeds to 306.

At 306 watermark and timing data is received. In one exemplary embodiment, the watermark data can be an eight bit watermark word or other suitable data. Likewise, the timing data can be a time allotted to a sequence of frames of data, such as seven successive frames. The method then proceeds to 308.

At 308, the watermark data is encoded into the converted audio channel audio data. In one exemplary embodiment, watermark data can be encoded by changing the phase difference between predetermined frequency bins for the left and the right channel audio data so as to have a predetermined phase difference, such as +Π/2 degrees difference to encode a one and −Π/2 degrees difference to encode a zero, or other suitable phase differences. In another exemplary embodiment, the watermark data can be encoded over two or more set of bins, such that two or more sets of watermark data are included in each frame. The method then proceeds to 310.

At 310, timing data is encoded into the frame data. In one exemplary embodiment, the timing data can include a predetermined phase difference between frames that is uniform over each frame, so as to create a detectable timing signature in the frame data. In this exemplary embodiment, a series of frames can be successively encoded, such as by changing the difference between frames by an amount equal to (Π−n*(Π/8)), where n varies between one and seven based on the sequence number of the frame of data. Likewise, other suitable phase differences between frames can also or alternately be used, such as where different frequency bins are varied by different amounts between frames. The method then proceeds to 312.

At 312, the magnitude of the frequency bins associated with the encoded watermark data and timing data is modified, if necessary. In one exemplary embodiment, the magnitude of the associated frequency bin can be increased so that the energy associated with the frequency bin is sufficient to allow the encoded watermark data and timing data to be detected, but not to an extent that the modified frequency bin would result in a noticeable change to the audio data. In this exemplary embodiment, the energy level associated with the magnitude can be set based on the Fletcher-Munson absolute threshold of hearing curve or in other suitable manners. The method then proceeds to 314.

At 314 the frame is transmitted, such as by converting the transformed data back from the transform domain to the time domain or by performing another suitable transform. The method then proceeds to 316.

At 316 it is determined whether there are additional frames requiring watermark and timing data. If no additional frames are necessary or available the method proceeds to 320 and watermarking is terminated. Otherwise the method proceeds to 318 where timing data is incremented. As discussed above, where timing data is modified between successive frames, such as using a formula (Π−n*(Π/8)), the value of "n" can be incremented, or other suitable timing data changes can be implemented. The method then returns to 302.

In operation, method 300 allows audio data to be watermarked using predetermined phase differences between predetermined frequency bins of frequency domain audio data. In this manner, the audio data is not noticeably modified by inclusion of the watermark data and the watermark data embedded in the audio data allows the source of the audio data or other information to be determined.

Figure 4:
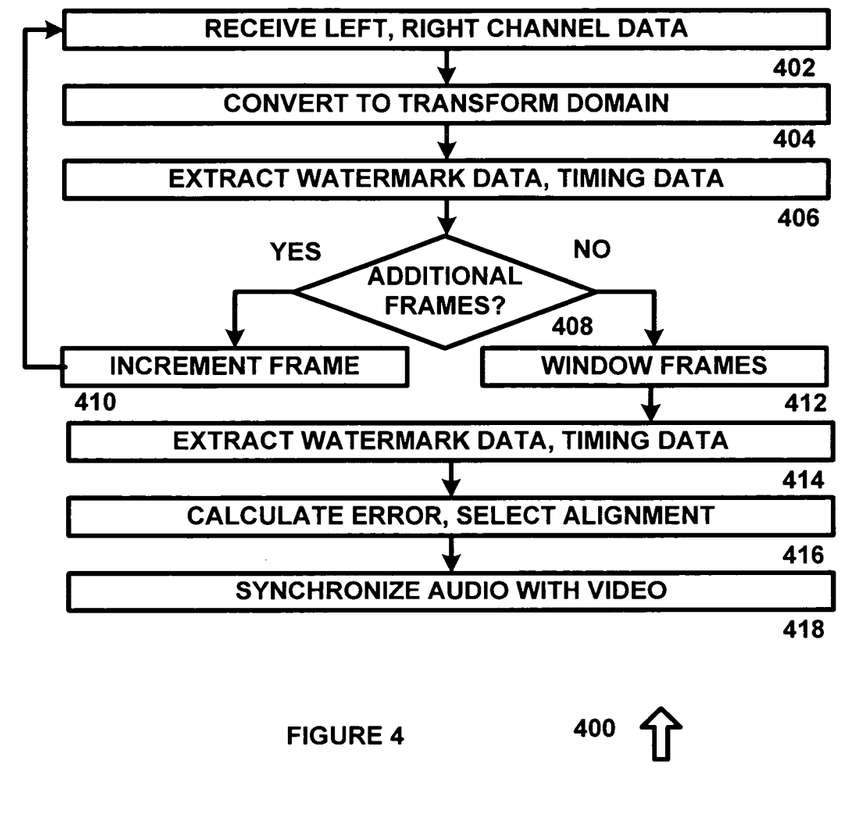
FIG. 4 is a diagram of a method for detecting watermark and audio data in accordance with an exemplary embodiment of the present invention.

FIG. 4 is a diagram of a method 400 for detecting watermark and audio data in accordance with an exemplary embodiment of the present invention. Method 400 begins at 402 where a right and left channel of watermarked audio data is received. The method then proceeds to 404 where the right and left channel watermarked audio data are converted to a transform domain, such as by performing an FFT of the data. The method then proceeds to 406.

At 406, watermark data and timing data are extracted. In one exemplary embodiment, watermark data can be extracted by comparing left and right channel phase data for a plurality of predetermined frequency bins to generate phase differences, and then by determining whether phase differences have a uniform predetermined value that indicates that a zero or one value bit of data has been encoded. Likewise, timing data can be extracted by determining a phase for an entire frame, predetermined frequency bins, or other suitable data and comparing that data to phase data for the prior frame, where each successive frame has a successively different phase difference. The method then proceeds to 408.

At 408 it is determined whether there are additional frames of data to process. In one exemplary embodiment, the timing data can be embedded in predetermined frequency bins for a sequence of frames, such as seven frames, so as to allow the frames to be detected by comparing the frequency bins for a sequence of frames. Likewise, other suitable processes can be used. If it is determined at 408 that additional frames are present, the method proceeds to 410 where the frame is incremented and the method then returns to 402. Otherwise the method proceeds to 412.

At 412, the frames are windowed, such as to generate a plurality of incremental frames between each captured frame. In one exemplary embodiment, processing can be performed on 1) frame 1 with no overlap with frame 2; 2) 75% of the trailing edge of frame 1 with 25% of the leading edge of frame 2; 3) 50% of the trailing edge of frame 1 with 50% of the leading edge of frame 2; and 4) 25% of the trailing edge of frame 1 with 75% of the leading edge of frame 2. In this manner, frame alignment can be performed to within one-quarter of an audio frame, such as within 5 milliseconds for a 20 millisecond frame. The method proceeds to 414.

At 414, watermark data and timing data are extracted for the windowed frames of data, such as by determining phase differences between the left and right channels at predetermined transform bins. The method then proceeds to 416, where an error value is calculated between an expected phase difference and a detected phase difference. The method then proceeds to 418.

At 418, the detected audio data, such as the audio data with a frame alignment having a lowest error rate, is synchronized with video data. In one exemplary embodiment, the video data can be transmitted independently of the audio data, can be processed during transmission or after receipt, or can otherwise require synchronization with the associated audio data in order to ensure that the audio data appears synchronized with associated video data by a user.

Figure 5:
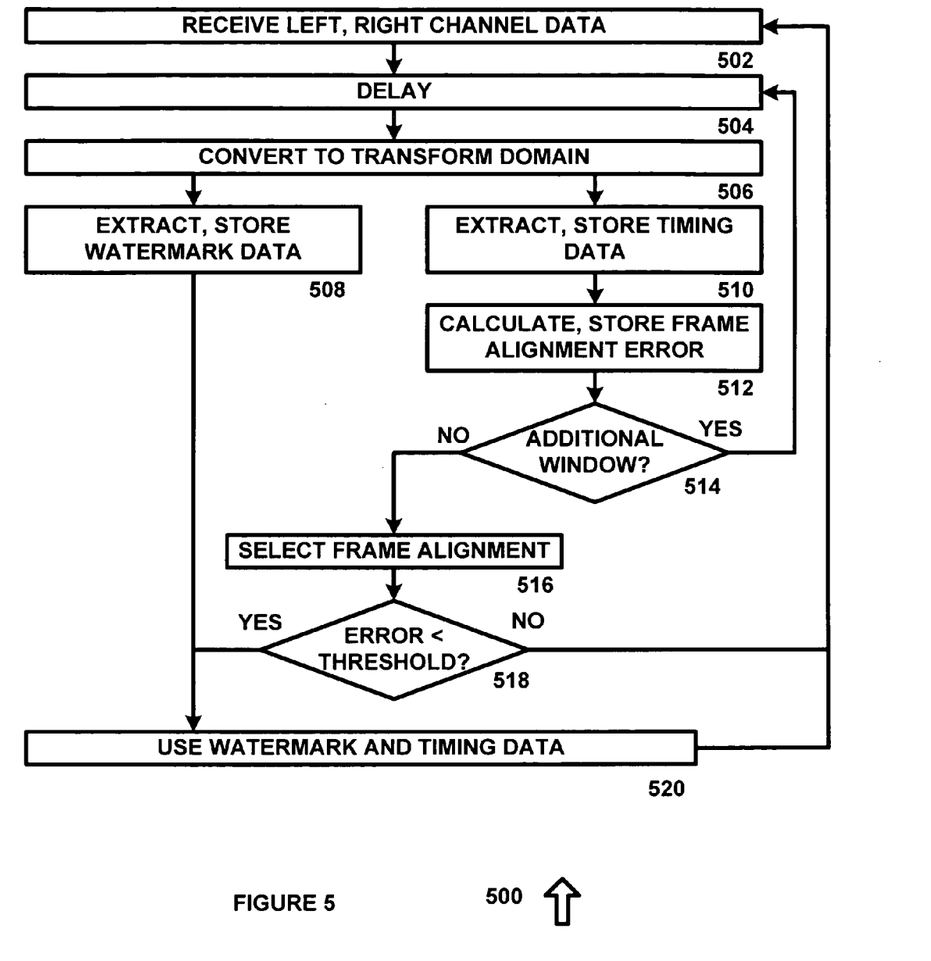
FIG. 5 is a diagram of a method for detecting watermark and audio data in accordance with an exemplary embodiment of the present invention.

FIG. 5 is a diagram of a method 500 for detecting watermark and audio data in accordance with an exemplary embodiment of the present invention. Method 500 begins at 502, where right and left channel audio data is received. The method then proceeds to 504 where the audio data is delayed, and at 506 the audio data is converted to a transform domain. Watermark data is extracted and stored at 508, and timing data is extracted and stored at 510. In one exemplary embodiment, the watermark and timing data can be obtained from phase differences measured between predetermined frequency bins or in other suitable manners. The method then proceeds to 512.

At 512, a frame alignment error is calculated using the timing data, such as in the manner previously described or in other suitable manners. The method then proceeds to 514 where it is determined whether an additional window should be processed, such as to optimize the frame alignment of the received audio data with the frames in which the watermark data was encoded, which may be required where the audio data is received asynchronously from the transmitter. If an additional window is required, the method returns to 504, otherwise the method proceeds to 516.

At 516, a frame alignment is selected, such as a frame alignment having a minimum error from a plurality of frame alignment candidates. The method then proceeds to 518 where it is determined whether the error for the frame alignment is less than a threshold error value, such as where it has been empirically determined that a threshold error value should be met to result in an acceptable level of certainty of the detected watermark. If it is determined that a threshold error level has not been met, the method returns to 502. Otherwise, the method proceeds to 520 where the stored watermark data and the timing data are used, such as to synchronize the audio data with video data, to verify the source of the audio data, or for other suitable purposes.

In view of the above detailed description of the present invention and associated drawings, other modifications and variations are apparent to those skilled in the art. It is also apparent that such other modifications and variations may be effected without departing from the spirit and scope of the present invention.

What is claimed is:

1. A system for identifying audio data comprising:
a transform system for receiving left channel audio data and right channel audio data and electronically generating a plurality of frequency bins of left channel magnitude data, left channel phase data, right channel magnitude data and right channel phase data;
a watermarking system for receiving watermarking data and electronically modifying predetermined frequency bins of the left channel phase data and the right channel phase data to encode the watermarking data;
a magnitude system for receiving the left channel magnitude data and the right channel magnitude data and increasing the left channel magnitude data and the right channel magnitude data for one or more of the predetermined frequency bins to a threshold level if the left channel magnitude data and the right channel magnitude data for the corresponding frequency bin are less than the threshold level; and
a timing system for receiving a plurality of bits of timing data and modifying two or more predetermined frequency bins of the left channel phase data and two or more predetermined frequency bins of the right channel phase data to encode each bit of the timing data;
wherein the predetermined frequency bins of the left channel phase data and the right channel phase data that are used to encode timing data are modified by different phase angles than the predetermined frequency bins of the left channel phase data and the right channel phase data that are used to encode watermarking data.

2. The system of claim 1 further comprising a frame adjustment system for receiving frame sequence data and modifying the timing data based on the frame sequence data.

3. The system of claim 1 wherein the transform system comprises:
a right channel transform system for receiving the right channel audio data and generating the plurality of frequency bins of the right channel magnitude data and the right channel phase data;
a left channel transform system for receiving the left channel audio data and generating the plurality of frequency bins of the left channel magnitude data and the left channel phase data.

4. The system of claim 1 wherein the magnitude system comprises:
a right channel magnitude system for receiving the right channel magnitude data and increasing the right channel magnitude data for one or more of the predetermined frequency bins to a threshold level if the right channel magnitude data for the corresponding frequency bin is less than the threshold level; and
a left channel magnitude system for receiving the left channel magnitude data and increasing the left channel magnitude data for one or more of the predetermined frequency bins to a threshold level if the left channel magnitude data for the corresponding frequency bin is less than the threshold level.

5. A method for identifying audio data comprising:
receiving left channel audio data and right channel audio data;
converting the left channel audio data and the right channel audio data into a plurality of bins of left channel phase data, left channel magnitude data, right channel phase data and right channel magnitude data;

encoding watermark data by electronically modifying a phase difference between the left channel phase data and the right channel phase data for each of a plurality of predetermined bins;

adjusting the left channel magnitude data and the right channel magnitude data for each of the plurality of predetermined bins to a predetermined threshold if the left channel magnitude data and the right channel magnitude data is less than the predetermined threshold; and receiving a plurality of bits of timing data and modifying two or more predetermined frequency bins of the left channel phase data and two or more predetermined frequency bins of the right channel phase data to encode each bit of the timing data;

wherein the predetermined frequency bins of the left channel phase data and the right channel phase data that are used to encode timing data are modified by different phase angles than the predetermined frequency bins of the left channel phase data and the right channel phase data that are used to encode watermarking data.

6. The method of claim 5 further comprising converting the plurality of bins of modified left channel phase data, adjusted left channel magnitude data, modified right channel phase data and adjusted right channel magnitude data into watermarked left channel audio data and watermarked right channel audio data.

7. The method of claim 5 wherein encoding the watermark data by modifying the phase difference between the left channel phase data and the right channel phase data for each of the plurality of predetermined bins comprises:

modifying the phase difference between the left channel phase data and the right channel phase data for each of a first plurality of predetermined bins based on a first bit of the watermark data; and modifying the phase difference between the left channel phase data and the right channel phase data for each of a second plurality of predetermined bins based on a second bit of the watermark data.

8. The method of claim 5 wherein encoding the watermark data by modifying the phase difference between the left channel phase data and the right channel phase data for each of the plurality of predetermined bins comprises:

modifying the phase difference between the left channel phase data and the right channel phase data for each of a first plurality of predetermined bins based on a first bit of the watermark data; and modifying the phase difference between the left channel phase data and the right channel phase data for each of a second plurality of predetermined bins based on the first bit of the watermark data.

* * * * *